United States Patent [19]

Neuman

[11] 3,755,957
[45] Sept. 4, 1973

[54] FISHHOOK HOLDING SYSTEM

[76] Inventor: August Neuman, 14283 Fordham, Detroit, Mich. 48205

[22] Filed: Feb. 12, 1971

[21] Appl. No.: 115,018

[52] U.S. Cl............................................. 43/57.5 R
[51] Int. Cl............................................. A01k 97/06
[58] Field of Search ................................ 43/57.5 R

[56] References Cited
UNITED STATES PATENTS

| | | | |
|---|---|---|---|
| 2,966,001 | 12/1960 | Sader............................ | 43/57.5 R X |
| 1,365,111 | 1/1921 | Lawrence........................ | 43/57.5 R |
| 3,430,379 | 3/1969 | Wolfrum......................... | 43/57.5 R |

*Primary Examiner*—Louis G. Mancene
*Assistant Examiner*—Daniel J. Leach

[57] ABSTRACT

Fishhook holding means comprising a pair of movable buttons with male and female detent means on opposing faces thereof and yieldable means yieldably compressing said buttons together so that the opposing faces are in contact with each other. The yieldable means hold the buttons so that they are freely rotatable and capable of a rocking action against each other and are operative against the exterior face of each button. The buttons are constructed so that the barbed end of a fishhook can pass between the centers of the opposing faces, whereby the barbed end of a fishhook can be held securely and safely therebetween and can be extracted therefrom by being pulled upon whereupon said barbed end passes between the opposing faces.

8 Claims, 10 Drawing Figures

PATENTED SEP 4 1973 3,755,957
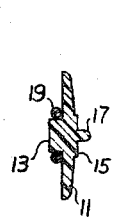
Fig-5
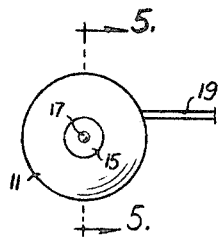
Fig-3
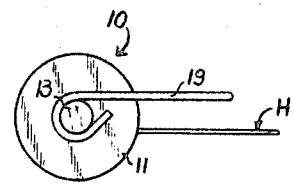
Fig-1
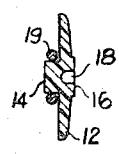
Fig-6
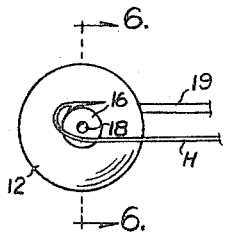
Fig-4
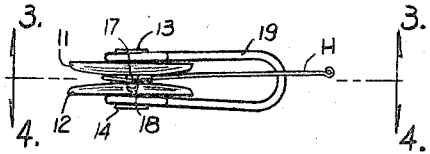
Fig-2
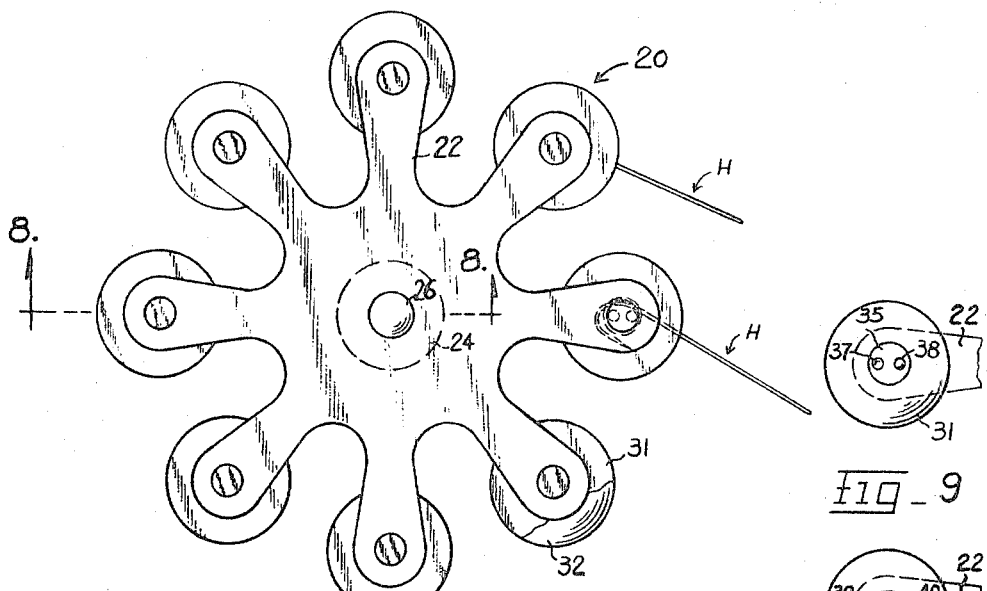
Fig-7
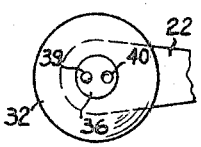
Fig-9
Fig-10
Fig-8
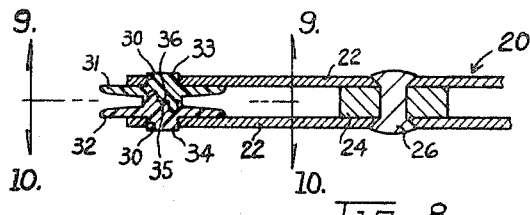
AUGUST NEUMAN
INVENTOR
BY William L. Fisher Esq.
HIS ATTORNEY

FISHHOOK HOLDING SYSTEM

My invention relates to fishhook holding systems.

The principal object of my invention is to provide improvements in fishhook holding systems including fishhook holding means and method having a unique holding action for holding fishhooks securely and safely so that the barbs thereof are covered and cannot cause injury or damage.

The foregoing object of my invention and the advantages thereof will become apparent during the course of the following description, taken in conjunction with the accompanying drawings, in which:

FIGS. 1–4 are, respectively, top plan, side elevational and fragmentary sectional views of a fishhook holding system embodying my invention; and FIGS. 5 and 6 are vertical sectional views of the structures of FIGS. 3 and 4, respectively, taken on the lines 5—5 and 6—6 thereof, respectively.

FIGS. 7–10 are, respectively, top plan, side elevational and fragmentary sectional views of another fishhook holding system embodying my invention.

Referring to the drawings in greater detail, 10 generally designates the embodiment of said fishhook holding system shown in FIGS. 1–4 which comprises a pair of buttons 11 and 12 capable of individual movement having opposing faces and retention means 13 and 14, respectively, on exterior faces thereof. Each said retention means 13 and 14 comprises a cylindrical platform which upstands from its respective exterior face. Each said exterior face is generally flat planar as is also each said opposing face except that the latter is radiused at its periphery toward its respective exterior face. Said opposing faces have flats 15 and 16 formed thereon which bear against each other and maintain said opposing faces spaced apart. Centrally formed in respect to said platforms flats 15 and 16 are male and female detent means 17 and 18, respectively, in the form of a spherical protuberance and a spherical depression which maintain the buttons 11 and 12 positioned together and hold the barbed end of a fishhook between said opposing faces.

Said fishhook holding system further comprises yieldable means for yieldably pinching the two buttons together which, in the instance, is in the form of a centrally U-bent spring wire member 19 having a pair of axially spaced apart arms which bear against said exterior faces. The free ends of said arms are bent into loops which encircle and engage said platforms 13 and 14.

In use of the embodiment 10, a fisherman can place the barbed end of one or more fishhooks between the opposing faces of the buttons 11 and 12 by inserting said barbed end behind said detent means 17 and 18 and by pulling upon the upper end of the fishhook shank until said barbed end is completely covered by said buttons 11 and 12 and securely held between said opposing faces and the detent means 17 and 18 are disposed within the confines of the U-bend containing the barb, whereby said barbed end cannot catch on objects while being transported whether the fishhook is free of or attached to a fishing line. The combination of the embodiment 10 and an unattached fishhook can be carried on one's person safely. If the fishhook is attached to a fishing line said combination can be attached to the fishing pole safely. To extract the fishhook from the embodiment 10 the upper end of the fishhook shank is pulled upon which causes said U-bend to separate the buttons 11 and 12 and pass between the detent means 17 and 18. During such extraction of the fishhook in respect to the embodiment 10, said buttons 11 and 12 rock against each other by virtue of the action of said U-bend upon the detent means 17 and 18. Said buttons 11 and 12 are each freely rotatable about an axis through their centers.

The embodiment shown in FIGS. 7–10 is generally designated 20 and comprises two opposing spring metal plates 22 held spaced apart by a spacer washer 24 at the hubs thereof through which fastening means 26 extends as well as through said plates 22. Each said plate 22 has a plurality of radially extending circumferentially spaced apart spring fingers which are provided with apertures 30 on the free ends thereof. A pair of buttons 31 and 32 are held between the free ends of each pair of said spring fingers via retention means 33 and 34, respectively, in the form of cylindrical platforms which upstand from respective exterior faces of the buttons 31 and 32. Each pair of spring fingers bear against said respective exterior faces and the apertures 30 encircle and engage the platforms 33 and 34. Said opposing faces of the buttons 31 and 32 have flats 35 and 36 identical to said flats 15 and 16. Two pairs of male and female detent means 37, 38 and 39,40 are alternately formed in said flats 35 and 36, respectively, in the forms of spherical protuberances and spherical depressions which maintain the buttons 31 and 32 positioned together, and hold the barbed end of a fishhook between said opposing faces.

In use of the embodiment 20, a fisherman can insert the barbed end of one or more fishhooks between the opposing faces of each pair of buttons 31 and 32 by inserting said barbed ends behind said detent means 37, 38 and 39,40 and by pulling upon the fishhook shank as before described so that said barbed ends are completely covered and securely held and cannot catch on objects while being transported whether the fishhooks are free or attached to fishing lines. A plurality of fishhooks can be carried on one's person safely by combining said fishhooks with said embodiment 20. Fishhooks of different wire diameters can be held between sets of buttons 31 and 32 without any one set affecting the holding ability of the other set. Said fishhooks are extracted from the embodiment 20 as before described and the buttons 31 and 32 of each set are capable of the same rotational and rocking motion as the buttons 11 and 12.

It will thus be seen that there has been provided by my invention, improvements in fishhook holding systems in which the object hereinabove set forth together with many thoroughly practical advantages has been successfully achieved. While a preferred embodiment of my invention has been shown and described it is to be understood that variations and changes may be resorted to without departing from the spirit of my invention as defined by the appended claims.

What I claim is:

1. In a fishhook holding system, fishhook holding means comprising a pair of moveable buttons with male and female detent means on opposing faces thereof, yieldable means yieldably compressing said buttons together so that said opposing faces are in contact with each other, said yieldable means holding said buttons so that they are freely rotatable and capable of a rocking action against each other, said yieldable means operative against the exterior face of each button, said buttons constructed so that the barbed end of a fishhook can pass between the centers of said opposing faces thereof, whereby the barbed end of a fishhook can be held securely and safely between said opposing faces and can be extracted therefrom by being pulled upon whereupon said barbed end passes between said opposing faces.

2. In a fishhook holding system, fishhook holding means as claimed in claim 1, said buttons having retention means on the exterior faces thereof, said yieldable means having retention means engaged with said button retention means.

3. In a fishhook holding system, fishhook holding means as claimed in claim 2, said buttons provided with face contacting flats on said opposing faces surrounding said detent means.

4. In a fishhook holding system, fishhook holding means as claimed in claim 2, said button retention means including a cylindrical platform raised from the respective exterior face, said yieldable means comprising a centrally U-bent spring wire member having a pair of axially spaced apart arms having their free ends looped about said cylindrical platforms.

5. In a fishhook holding system, fishhook holding means as claimed in claim 2, said button retention means including a cylindrical platform raised from the respective exterior face, said yieldable means comprising a pair of axially spaced apart spring plates fastened together at the hubs thereof, said plates providing at least a pair of spaced apart spring fingers, said pair of buttons held between the free ends of said spring fingers, said spring fingers having apertures on their free ends through which said cylindrical platforms extend.

6. In a fishhook holding system, fishhook holding means as claimed in claim 5, said plates providing a plurality of radially extending circumferentially spaced apart pairs of spring fingers, a pair of said buttons held between the free ends of each pair of spring fingers.

7. In a fishhook holding system, fishhook holding method comprising providing a pair of buttons with male and female detent means on opposing faces thereof, yieldable holding means compressing said buttons together so that said opposing faces are in contact with each other, and holding said buttons so that they are freely rotatable and capable of a rocking action against each other, said yieldable holding means being against the exterior face of each button, said buttons constructed so that the barbed end of a fishhook can pass between the centers of said opposing faces thereof, whereby the barbed end of a fishhook can be held securely and safely between said opposing faces and can be extracted therefrom by being pulled upon whereupon said barbed end passes between said opposing faces.

8. In a fishhook system, fishhook holding method as claimed in claim 7 including providing retention means on the exterior faces of said buttons and said yieldable holding means holding said buttons by engaging said button retention means.

* * * * *